Figure 1:
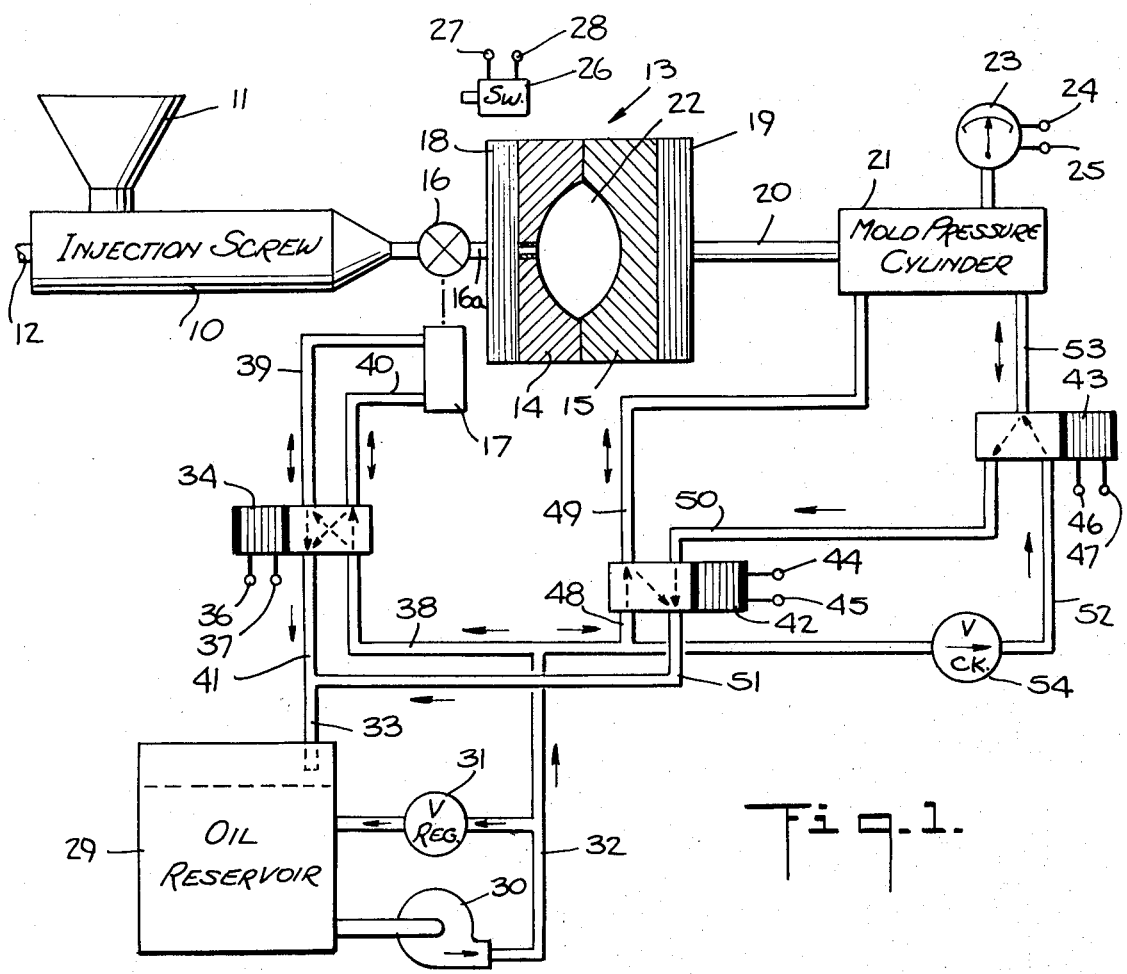

United States Patent [19]
Loichen

[11] 3,771,935
[45] Nov. 13, 1973

[54] INJECTION MOLDING APPARATUS
[76] Inventor: Erwin Loichen, Muenchener Strasse 60, 8890 Aichach, Germany
[22] Filed: July 21, 1971
[21] Appl. No.: 164,707

[52] U.S. Cl................................. 425/146, 425/245
[51] Int. Cl............................................... B29f 1/06
[58] Field of Search................... 425/146, 376, 145, 425/245

[56] References Cited
UNITED STATES PATENTS
3,188,691  6/1965  Stenger............................... 425/146
3,642,404  2/1972  Nagawa............................... 425/145

Primary Examiner—J. Spencer Overholser
Assistant Examiner—Brian Ross
Attorney—Lorimer P. Brooks et al.

[57] ABSTRACT

Apparatus for injection molding of plastic in which an injection screw is connected to a two-part mold through a valve which is opened when injection of the plastic is commenced. The mold parts are held together by a hydraulic cylinder and piston assembly, and when the hydraulic pressure exceeds a predetermined value a contact closes which closes said valve, and the mold is opened after a time delay.

10 Claims, 2 Drawing Figures

INVENTOR.
ERWIN LOICHEN

INJECTION MOLDING APPARATUS

This invention relates to injection molding apparatus and particularly, to apparatus for making articles from plastics by injecting the heated plastic into a multi-part mold.

According to one process known in the art, the molding material, which is heated by various means until it is molten, is injected into a mold having a plurality of parts which are held together with force or pressure sufficient to overcome the pressure exerted on the parts by the injected material. In order to be sure that all parts of the mold cavities are completely filled, a volume of molding material in excess of the volume of the mold cavity is moved toward the mold and in the final stage of injection relatively high pressures, in excess of those required to move the bulk of the molding material, are used to force or inject the molding material into the mold which means that the material from which the mold is made must be relatively strong and hard and that the mold clamping forces are high, requiring powerful clamping devices. Thus, even though the pressure per square inch on the molding material may be only a few thousand pounds, the molten material acts like an hydraulic fluid causing a total force of many times the molding pressure, dependent on the cavity area, to be applied to the mold parts. For example, if the injection pressure is 3,000 p.s.i., the mold clamping force may be as high as, or higher than, 300,000 pounds. Accordingly, the mold parts and clamping devices usually are made of high tensile strength steel and are relatively expensive.

Injection pressure is influenced by many factors. For example, the speed of delivery of the molding material, the nature of the molding material, the nature of the mold passageways, the size of the injection orifice, etc. It has heretofore been proposed to limit the injection period and to reduce the injection pressure when the pressure exceeds a predetermined value, but such is not a reliable way to control the pressure because of the aforesaid variables and because the predetermined value is not necessarily a realiable indication of the pressure required to fill the mold cavities. It has also been proposed to stop injection when a predetermined molding material pressure is reached at a selected portion of a mold cavity, but again, this is not satisfactory because the pressure at one point is not necessarily an indication that the mold cavity has been filled completely.

The present invention overcomes the foregoing problems by terminating the supply of molding material when the pressure on the mold parts exceeds a predetermined value. Such value of such pressure is not exceeded by the injection pressure during the bulk of the molding material flow even though the injection pressure varies, and since the pressure on the mold parts depends not only upon the molding material pressure but also upon the total area contacted by the molding material, then the mold part pressure is not directly dependent upon the molding material pressure and hence, upon the molding material pressure at a selected point. In fact, it has been found that by terminating the injection of the molding material when the mold part pressure exceeds a predetermined value, the pressure to which the mold, and hence the clamping devices, is subjected can be kept to a relatively low value without the loss of molding article quality. Therefore, the mold parts and the clamping devices can be made simpler and of less expensive materials, such as aluminum.

One object of the invention is to provide molding apparatus which reduces the maximum pressure to which the mold parts and clamping devices are subjected.

Another object of the invention is to reduce the cost of and to simplify the mold parts and the clamping devices therefor.

Figure 2:
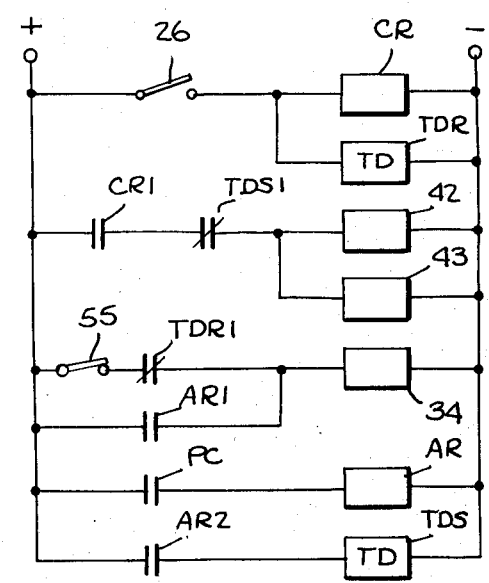

Other objects of the invention will be apparent from the following detailed description of a presently preferred embodiment thereof, which description should be considered in operable with the accompanying drawing in which: mold FIG. 1 is a schematic diagram of one preferred embodiment of the invention; and FIG. 2 is an electrical circuit diagram for the electrical components in the embodiment of FIG. 1.

The injection molding apparatus illustrated schematically in FIG. 1 is particularly suited for the injection molding of thermoplastic material, one such material being polyvinylchloride, which may have a Shore hardness up to 90/95. The material to be molded, which may be scrap, granules or paste, is fed to a conventional injection screw 10 through a hopper 11 and the drive shaft 12 of the screw 10 is driven by conventional means, such as an electric motor (not shown). The injection screw 10 also is heated in any conventional manner, such as by heater jackets or bands therearound which are thermostatically controlled.

After the molding material is rendered molten in the injection screw 10, it is supplied to a two-part mold 13 having the parts 14 and 15, through an orifice valve 16 and a nozzle 16a which may be heated in a conventional manner.

The valve 16 is controlled by the hydraulic piston and cylinder assembly 17 and is opened thereby during the supply of the molten molding material to the mold 13.

The parts of the mold 13, which may be made of a relatively low strength material, such as aluminum, are held between a pair of platens 18 and 19, the platen 18 being fixed and the platen 19 being carried by the piston shaft 20 of an hydraulic piston and cylinder assembly 21. The platens 18 and 19 hold the parts 14 and 15 in assembled relation during the injection of the molding material in the cavity 22 of the mold 13, but platen 18 may be omitted if the part 14 has sufficient strength, by pressing the part 14 against the nozzle 16a. The pressure of the fluid in the assembly 21, in the pressure applying position thereof, is indicated by a meter 23 having a pair of electrical contacts connected to the terminals 24 and 25 which contacts may be set to close at a predetermined pressure of the hydraulic fluid supplied to the assembly 21.

The apparatus also comprises a switch 26 having a pair of terminals 27 and 28, the switch 26 being manually operable such as by the closing of the guard which conventionally surrounds the mold 13 during the molding operation.

Fluid, such as oil, is maintained in a reservoir 29 having a pump 30 connected thereto for supplying fluid under pressure to the piston and cylinder assemblies 17 and 21. A pressure regulating valve 31 is connected to the line 32 at the outlet of pump 30. Fluid is returned to the reservoir 29 through the line 33.

The operation of the piston and cylinder assembly 17, and hence, the opening and closing of the valve 16, is controlled by a solenoid valve 34 having a pair of electrical terminals 36 and 37. When the solenoid of the valve 34 is energized, fluid is supplied by way of lines 32, 38 and 39 causing the assembly 17 to close the valve 16, and fluid is permitted to return from the assembly 17 to the reservoir 29 by way of lines 40 and 41.

When the solenoid of the valve 34 is de-energized, fluid under pressure flows by way of lines 32, 38 and 40 to the assembly 17, permitting the valve 16 to open and, fluid is returned from the assembly 17 to the reservoir 29 by way of lines 39 and 41.

The flow of fluid to and from the piston and cylinder assembly 21 is controlled by a pair of solenoid valves 42 and 43 having terminals 44 and 45 and 46 and 47 respectively. Valve 42 is connected to lines 48–51, and valve 43 is connected to lines 50, 52 and 53. When the solenoids of valves 42 and 43 are energized, fluid under pressure is supplied by way of lines 32, 52 and 53 to the assembly 21 causing it to apply pressure to the mold 13 and return fluid flows from the assembly 21 to the reservoir 29 by way of lines 49, 51 and 33. When the solenoids of valves 42 and 43 are de-energized, fluid under pressure is supplied to the assembly 21 by way of lines 32, 48 and 49, thereby releasing the mold 13, and the return flow of fluid from the assembly 21 to the reservoir 29 is by way of lines 53, 50, 51 and 33. A check valve 54 is included in the line 52 to prevent reverse flow of fluid in the line 52 when the solenoid of the valve 43 is energized and when the pressure on the mold parts 14 and 15 increases as a result of the filling of the cavity 22.

The electrical circuit diagram of an arrangement of the solenoids and switches for automatic operation is illustrated in FIG. 2, and from such diagram, it will be seen that the switch 26 controls a relay CR having normally open contacts CR1, and a time delay relay TDR having normally closed contacts TDR1 in series with a switch 55. The contacts of the meter 23 are shown as normally open contacts PC which control a relay AR having normally open contacts AR1 and AR2. The contacts AR2 are in circuit with a time delay relay TDS having normally closed contacts TDS1.

The sequence of operation of the relays and solenoids is as follows:

1. After the molding material is rendered molten by heating, the switch 26 is manually closed.
2. The relays CR and TDR are energized by the switch 26 causing substantially immediate closing of the contacts CR1 and the energization of the solenoids of the valves 42 and 43, and, a short time thereafter, causing opening of the contacts TDR1.
3. When the contacts TDR1 open, the solenoid of the valve 34 is de-energized causing operation of the assembly 17 and opening of the valve 16, thereby permitting the molding material to flow into the cavity 22 of the mold 13.
4. When the cavity 22 is filled, the pressure tending to separate the mold parts 14 and 15 suddenly increases causing an increase of the fluid pressure in the assembly 21 and closing of the contacts PC.
5. Closing of the contacts PC energizes the relay AR and causes closing of the contacts AR1 and AR2.
6. When contacts AR1 close, the solenoid of the valve 34 is energized causing closing of the valve 16 and termination of the injection of molding material into cavity 22.
7. When contacts AR2 close they energize the time delay relay TDS which, after a suitable period of time, e.g., a few seconds, opens the contacts TDS1 which in turn de-energize the solenoids of the valves 42 and 43. Deenergization of the solenoids of the valves 42 and 43 causes the assembly 21 to separate the mold part 15 from the mold part 14.

Although in the preferred embodiment the cycle of injection molding is initiated manually by the switch 26 and is automatic thereafter, it will be apparent to those skilled in the art that certain of the operations may be controlled manually. For example, contacts TDS1 may be replaced by, or put in series with, a manual switch for operating the assembly 21 for releasing the mold, and the contacts TDR1 may be omitted if it is desired to open the valve 16 manually by the switch 55.

As an example of the operation of the apparatus of the invention, the injection screw 10 is filled through the hopper 11 with polyvinylchloride scrap and the heaters for the screw 10 and the nozzle 16a, are energized. The screw 10 can develop a very high pressure and is always greater than the pressure applied to the mold 13 which is adjusted in a conventional manner to that required to maintain the mold parts 14 and 15 in their assembled relation until the cavity 22 is filled. Small mold cavities require less mold pressure than large mold cavities. The contacts PC of the meter 23 are set to close at a pressure slightly above the desired mold pressure.

When the plastic scrap reaches a temperature of about 120° – 150°C, the screw drive is started, thereby rotating the shaft 12, with the valve 16 closed and the nozzle 16a against the mold inlet opening in the part 14. Preferably, a few molding cycles are then performed by manually operating the controls to make certain that all parts are properly adjusted and the desired quality of molded article is obtained, the hopper 11 being refilled as required. Once it is ascertained that the apparatus is functioning properly, it is placed on automatic operation, and the operator commences such by closing the switch 26.

As described hereinbefore, closing of the switch 26 first causes operation of the assembly 21 to apply pressure to the mold 13 thereby closing it and pressing it in the direction of the nozzle 16a. Shortly thereafter, the valve 16 opens permitting the flow of plastic molding material into the cavity 22. When the cavity is filled, the pressure on the mold part 15 increases, the increase being reflected by an increase in the fluid pressure in the assembly 21 which causes the contacts PC to close.

When the contacts PC close, the valve 16 closes thereby preventing a further increase of pressure within the mold 13. Shortly thereafter, the time necessary for the molded article to cool until it will not deform, the fluid supply to the assembly 21 is reversed causing the parts 14 and 15 to separate. The operator opens the switch 26 and removes the molded article. The apparatus is then ready for the next molding cycle and hence, the molding of another article.

It will be noted from the foregoing that the total pressure on the mold parts does not exceed that determined by the setting of the PC contacts and that, therefore, the pressure per square inch thereon may be kept much lower than the pressure per square inch which can be applied to the molding material by the screw 10. Accordingly, the mold 13 need not be made of a material capable of withstanding the full pressure which the screw 10 can apply, but instead may be made of relatively low strength materials such as aluminum thereby reducing the expense of the mold.

Various other advantages and modifications of the invention will be apparent to those skilled in the art, the preferred embodiment described herein being merely representative of the principles of the invention.

What is claimed is:

1. In an injection molding machine having a multipart mold, means for injecting molding material under pressure into said mold, and mold pressure means for applying pressure to said mold parts during the injection of the molding material to hold such parts in molding relation against the pressure of the molding material during the injection thereof into said mold, the combination therewith of a valve intermediate said injecting means and said mold for controlling the flow of molding material from said injecting means to said mold, said valve having an open position permitting flow of said material into said mold and a closed position preventing flow of said material into said mold, means for opening said valve upon initiation of the injection cycle and means responsive to the pressure applied by said mold pressure means to said mold for closing said valve when said pressure exceeds a predetermined value.

2. The combination set forth in claim 1 in which said mold pressure means comprises a cylinder and piston assembly operable by fluid under pressure, and wherein said means for closing said valve comprises means responsive to the pressure of said fluid.

3. The combination set forth in claim 2 in which said injecting means comprises an injection screw.

4. The combination set forth in claim 2 wherein said valve is electrically operable and said means for closing said valve comprises a pressure switch controlled by said fluid and connected in circuit with said valve for closing said valve when the pressure of said fluid exceeds a predetermined value.

5. The combination set forth in claim 4 further comprising means controlled by said pressure switch and controlling said cylinder and piston assembly for removing pressure from said mold after closing of said valve.

6. In an injection molding machine having a multipart mold, means for injecting molding material into said mold, and a cylinder and piston assembly Operable by fluid under pressure for applying pressure to said mo'd parts during the injection of the molding material, the combination therewith of a first electrically operable valve intermediate said injecting means and said mold for controlling the flow of molding material from said injecting means to said mold, said valve having an open position permitting flow of said material into said mold and a closed position preventing flow of said material into said mold; means for opening said valve upon initiation of the injection cycle comprising a manually operable switch and a first time delay switch operable by said manually operable switch connected to said valve for opening the latter a predetermined time after operation of said manual switch; a second electrically operable valve for controlling the supply of fluid to said cylinder and piston assembly, said second valve being in circuit with said manually operable switch for supplying fluid to said cylinder and piston assembly prior to opening of said first valve; a pressure switch responsive to the pressure of said fluid connected in circuit with said first valve for closing said first valve when the pressure of said fluid exceeds a predetermined value; and a second time delay switch in circuit with said pressure switch and said second valve for stopping the supply of fluid to said cylinder and piston assembly after said first valve is closed.

7. Injection molding apparatus comprising: a multipart mold for receiving molding material; a hydraulic system for maintaining the parts of said mold in molding relation and for permitting said parts to be separated, said system comprising a cylinder and piston assembly connected to at least one of said parts for forcing it against another thereof and for permitting said one part to be separated from the other thereof, a source of fluid under pressure and first and second electrically operable valves connected between said source and said assembly for alternately applying pressure and releasing said one part; means for supplying molding material under pressure to said mold; a third valve, hydraulically operable, intermediate said supplying means and said mold for alternately permitting and stopping the flow of molding material from said supplying means to said mold; a fourth valve, electrically operable, connected between said source and said third valve for alternately opening and closing said third valve; a manually operable switch connected to said fourth valve for operating said fourth valve and thereby opening said third valve and connected to said first valve for admitting fluid to said assembly; and a pressure switch connected to said hydraulic system and responsive to the pressure of the fluid therein and connected to said fourth valve for operating the latter, when the fluid pressure in said hydraulic system exceeds a predetermined value and thereby closing said third valve.

8. Apparatus as set forth in claim 7 further comprising a check valve between said assembly and said source for preventing flow of fluid from said assembly to said source when pressure is being applied to said one part of said mold.

9. Injection molding apparatus comprising: a multipart mold for receiving molding material; a hydraulic system for maintaining the parts of said mold in molding relation and for permitting said parts to be separated, said system comprising a cylinder and piston assembly connected to at least one of said parts for forcing it against another thereof and for permitting said one part to be separated from the other thereof, a source of fluid under pressure and first and second electrically operable valves connected between said source and said assembly for alternately applying pressure and releasing said one part; means for supplying molding material under pressure to said mold; a third valve, hydraulically operable, intermediate said supplying means and said mold for alternately permitting and stopping the flow of molding material from said supplying means to said mold; a fourth valve, electrically operable, connected between said source and said third valve for alternately opening and closing said third valve; a manually operable switch connected to said first valve for admitting fluid to said assembly; a time delay switch connecting said manually operable switch to said fourth valve for operating said fourth valve a predetermined time after operation of said manually operable switch and thereby delaying opening of said third valve until pressure is applied to said one part; and a pressure switch connected to said hydraulic system and responsive to the pressure of the fluid therein and connected to said fourth valve for operating the latter, when the fluid in said hydraulic system exceeds a predetermined value and thereby closing said third valve.

10. Apparatus as set forth in claim 9 further comprising a second time delay switch connected between said pressure switch and said first and second valves for operating the latter after closing of said third valve thereby to re-move pressure from said one part after said third valve is closed.

* * * * *

UNITED STATES PATENT OFFICE
CERTIFICATE OF CORRECTION

Patent No. 3,771,935          Dated November 13, 1973

Inventor(s) Erwin Loichen

It is certified that error appears in the above-identified patent and that said Letters Patent are hereby corrected as shown below:

Column 2, line 12, "operable" should read --connection-- line 13, "mold" after --:-- should be deleted

Column 5, line 46, "Operable" should not be capitalized line 48, "mo'd" should read --mold--

Signed and sealed this 2nd day of April 1974.

(SEAL)
Attest:

EDWARD M. FLETCHER, JR.
Attesting Officer

C. MARSHALL DANN
Commissioner of Patents